United States Patent Office 3,540,983
Patented Nov. 17, 1970

3,540,983
METHOD FOR PRODUCING PROTEIN BY GROWTH OF MICROORGANISMS ON A WATER EXTRACT OF COAL
Michael James Rose, Greenbelt, Jerry Michael Carosella, Laurel, and John Douglas Corrick and Joseph Augustine Sutton, Rockville, Md., assignors to the United States of America as represented by the Secretary of the Interior
No Drawing. Filed Apr. 11, 1968, Ser. No. 720,494
Int. Cl. C12d 13/06
U.S. Cl. 195—28
8 Claims

ABSTRACT OF THE DISCLOSURE

Coal is extracted with water, and the extract is employed as nutrient for microorganisms.

---

This invention, which relates to the cultivation of microorganisms as a protein source, resulted from work done by the Bureau of Mines in the U.S. Department of the Interior, and domestic title to the invention is in the Government.

Unicellular microorganisms (bacteria, yeasts and fungi) offer a potential, vast source of food protein. For this reason much research has been devoted to discovering inexpensive, abundant nutrients for such organisms. Heretofore, petroleum-derived products and Fischer-Tropsch fractions obtained from coal have shown promise in this regard. However, the high costs of such materials are an obvious drawback.

We have now discovered that a water extract of coal can be employed as nutrient for many microorganisms.

It is therefore an object of this invention to provide a method for producing microbial protein. Another object is to provide a cheap, abundant nutrient for microorganisms. A further object is to produce microbial protein with the aid of lignite, leonardite, or subbituminous coal (higher ranking coal than lignite, lower ranking than bituminous). Other objects and advantages will be obvious from the following detailed description of the invention.

In the practice of the invention, a water extract of coal is first prepared. Only very minor amounts of the coal constituents need be dissolved in the water during extraction. Extracts containing less than 0.25 weight percent of the coal will cultivate the growth of any microorganisms which can employ coal as nutrient.

Extraction is accomplished by contacting the coal with fresh water (e.g., distilled or tap water) in the usual extraction manner. A single contacting step or countercurrent contact is suitable. The same portion of water can be passed in contact with the coal a plurality of times, each contacting step being carried out at the same or a different temperature. Alternatively, the coal can be contacted with a plurality of separate water portions, each resultant extract serving as nutrient medium.

As will be readily apparent to those skilled in the art, contacting time depends upon such factors as the solids-liquid ratio, particle size of the coal, and the extractant water temperature. Such temperatures can vary from about 25° C. to about 125° C. Coal particle size should not be so small as to render solids-liquid separation too difficult and should not be so large as to unduly increase the contact time required. A coal particle size ranging from about 8 mesh to about 200 mesh, and a coal-water weight ratio of about 1/1 to about 1/100 are suitable for the purpose of the invention.

After separating the water extract from residual solids by, for example, filtration or centrifugal force, the extract is sterilized by heating, under pressure, to a temperature of about 121° C. to about 125° C.

Upon inoculation of the sterilized extract with appropriate microorganisms, environmental conditions are adjusted with regard to the organism's optimum growth temperature range, and with regard to wheather the organism is aerobic, anaerobic or facultative. As an example, the yeast *Candida tropicalis* grows rapidly in the presence of a water extract of lignite, leonardite or subbituminous coal when the following environmental growth conditions are employed: (1) a temperature of about 20° C. to about 35° C., preferably about 30° C.; and (2) a pH of 4 to 8 in the presence of absence of air, preferably in the presence of air at a pH of 4 to 5. Aerobic conditions are established by, for example, bubbling air through the nutrient medium, or by stirring.

Among the appropriate yeasts are *Candida tropicalis, Candida lipolytica, Candida pulcherrima, Candida utilis, Torulopsis colliscubsa, Hansenula anomala.* Preferably the bacteria which are employed are of the family Pseudomonadaceae. A preferred specie is *Pseudomonas aeruginosa.* If desired, the microorganism may be a mold or fungi such as *Rhodotorula gracilis.*

Each microorganism's growth rate will of course vary from that of other microorganisms. Thus, the time lapse after which the microorganism is removed from the aqueous nutrient medium must be predetermined for each organism. Separation of the organism from the culture fluid is accomplished by centrifugation to concentrate and precipitate the cells. Thereafter the liquid is simply decanted. Spent culture fluid can be reused as the fresh water source to prepare additional hot or cold water extracts of coal.

Although the water extract of coal is capable of supporting growth of microorganisms without the addition of supplementary growth materials, additional nutrients can be added if desired. Examples of such additives are yeast nitrogen base, Sohngen's solution (Bacteriol. Rev., vol. 10, pp. 1–49 (1946), $KH_2PO_4$, urea, $NH_4NO_3$, $MgSO_4$, $K_2HPO_4$, $(NH_4)_2SO_4$, $NH_4Cl$ and acetate buffer (0.3 ml. acetic acid and .68 g. sodium acetate in 100 ml. distilled water). Liquid animal nitrogenous wastes such as urine are particularly effective in that the addition of this material in amounts of from about 0.5 to about 10.0 volume percent (based on total volume) can increase the maximum yield of viable cells by as much as ten-fold. Adding glucose, in amounts of about 0.1 to about 10.0 g./100 ml., to a urine-treated extract can cause a further ten-fold increase in cell growth beyond that produced by the urine-containing extract. Glucose is also particularly effective when used with other additives.

Many of the above-mentioned organisms, after separation from nutrient, are ready, without further purification, as a potential source of protein food for both animals and humans.

The following example illustrates one manner in which the present invention has been carried out:

(I)

Lignite was ground to —200 mesh in a ball mill. 100 g. of the comminuted lignite was then mixed with 1 liter of cold tap water and stirred at 100–300 r.p.m. for 4 hours. Thereafter the mixture was filtered through Whatman #5 filter paper and one through a Sietz filter. Resultant filtrate was sterilized at 121° C. and 15 p.s.i.g. for 15 minutes.

A *Candida tropicalis* culture was injected into the sterilized water extract and into a sterilized tap water control sample (both at 30° C.) to establish an initial viable cell count of 100/ml. At the end of 5 days the control sample had a reduced viable cell count of 70/ml.

while the water extract had an increased viable cell count of 760,000/ml.

The effects of serially extracting a body of coal with separate water samples are illustrated by the following example:

(II)

A 100 g. portion of −200 mesh leonardite was contacted for two hours with 1 liter of distilled water at 100° C. Leonardite residue from this first extraction was then contacted with another liter of distilled water for two hours to obtain a second water extract. In this manner, six fractions of water extract were prepared from the same portion of leonardite. While the first extract contained approximately 3% (by weight) of the leonardite dissolved therein, and the sixth extract contained a little more than 0.5% of the original leonardite dissolved therein, infrared spectrometry showed only minor differences in the spectra of untreated leonardite and the several extracts. Each sterilized extract (along with a control sample of distilled water) was then inoculated with *C. tropicalis* to establish a viable cell count of 500/ml. No supplemental nutrients were employed. The cell count in each sample (maintained at 30° C.) was taken once a day for several days, and the following results were obtained:

| | Approximate viable cell count per millimeter | | | | |
|---|---|---|---|---|---|
| Time lapse in days | Control | First extract | Secind extract | Fourth extract | Sixth extract |
| 1 | 600 | 500 | 500 | 525 | 500 |
| 2 | 650 | 3,500 | 3,000 | 3,500 | 1,500 |
| 3 | 600 | 3,000 | 2,500 | 5,000 | 3,000 |
| 4 | 300 | 70,000 | 55,000 | 65,000 | 45,000 |
| 5 | 150 | 90,000 | 80,000 | 120,000 | 100,000 |
| 6 | 35 | 95,000 | 130,000 | 80,000 | 50,000 |

This table shows that the sixth extract, despite the fact that it had considerably less leonardite material dissolved therein in comparison to the first extract, supported growth about as well as the first extract.

Additional extracts made from the same leonardite sample as used in this example were capable of supporting growth to the same degree as the first six extracts, although some of the additional extracts contained less than 0.25 weight percent of the original leonardite dissolved therein. However, the growth rate was slower.

Other tests with leonardite water extracts have shown that concentrating the extract (prior to inoculation) by parial evaporation of the water therein does not increase microorganism growth. On the contrary, although the final yield equals that obtained with unconcentrated extract, it takes several days longer to reach optimum growth.

By the process of the present invention, coal is used as an inexpensive carbon and energy source for the production of microbial protein. While the process is well adapted to carry out the objects of the present invention, it is to be understood that various modifications and changes may be made all coming within the scope of the following claims.

What is claimed is:

1. A process for producing microbial protein by cultivating unicellular microorganisms which are suitable as food protein and which can employ coal as nutrient comprising
    (a) extracting comminuted coal with fresh water to form a water extract, said coal selected from the group consisting of lignite, leonardite and subbituminous;
    (b) sterilizing said extract; and
    (c) cultivating said microorganisms in the presence of said sterilized extract.

2. The process of claim 1 wherein the microorganisms are yeasts selected from the group consisting of *Candida torpicalis*, *Candida lipolytica*, *Candida pulcherrima*, *Candida utilis*, *Torulopsis collisculosa*, *Hansenula anomala*, and mixtures thereof.

3. The process of claim 1 wherein the microorganisms are selected from the group consisting of *Rhodotorila gracilis* and *pseudomonas aeruginosa*.

4. The process of claim 1 wherein animal liquid nitrogenous waste is added to the extract as a supplementary nutrient.

5. The process of claim 4 wherein glucose is added to the extract as additional supplementary nutrient.

6. The process of claim 2 wherein the microorganism is *Candida torpicalis*.

7. The process of claim 6 wherein animal liquid nitrogenous waste is added to the extract as a supplementary nutrient.

8. The process of claim 7 wherein glucose is added to the extract as additional supplementary nutrient.

References Cited

Silverman et al.: "Food From Coal-Derived Materials by Microbial Synthesis," Nature, pp. 735–6, Aug. 13, 1966.

Goswami et al.: "Biosynthesis of Protein From Coal," Fuel Research Institute News (FRI), vol. 17, March 1967, pp. 8–11.

A. LOUIS MONACELL, Primary Examiner

S. RAND, Assistant Examiner

U.S. Cl. X.R.

195—82, 100